(12) United States Patent
Menczer et al.

(10) Patent No.: US 10,289,955 B2
(45) Date of Patent: May 14, 2019

(54) SYSTEMS AND METHODS FOR PREDICTING MEME VIRALITY BASED ON NETWORK STRUCTURE

(71) Applicant: Indiana University Research and Technology Corporation, Indianapolis, IN (US)

(72) Inventors: Filippo Menczer, Bloomington, IN (US); Lilian Weng, Bloomington, IN (US); Yong Yeol Ahn, Jr., Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 729 days.

(21) Appl. No.: 14/775,403

(22) PCT Filed: Mar. 12, 2014

(86) PCT No.: PCT/US2014/024062
§ 371 (c)(1),
(2) Date: Sep. 11, 2015

(87) PCT Pub. No.: WO2014/159540
PCT Pub. Date: Oct. 2, 2014

(65) Prior Publication Data
US 2016/0042284 A1 Feb. 11, 2016

Related U.S. Application Data

(60) Provisional application No. 61/783,615, filed on Mar. 14, 2013.

(51) Int. Cl.
*G06N 5/04* (2006.01)
*G06Q 30/02* (2012.01)
*G06Q 50/00* (2012.01)

(52) U.S. Cl.
CPC .......... *G06N 5/04* (2013.01); *G06Q 30/0202* (2013.01); *G06Q 50/01* (2013.01)

(58) Field of Classification Search
None
See application file for complete search history.

(56) References Cited

U.S. PATENT DOCUMENTS 7,698,380 B1 * 4/2010 Amidon ................. G06Q 10/04
709/217
8,332,512 B1 12/2012 Wu et al.
(Continued)

FOREIGN PATENT DOCUMENTS

WO WO 2010/127150 A2 11/2010

OTHER PUBLICATIONS

US 7,631,053 B1, 12/2009, Amidon et al. (withdrawn)
(Continued)

*Primary Examiner* — Alan Chen
(74) *Attorney, Agent, or Firm* — Woodard, Emhardt, Henry, Reeves & Wagner, LLP

(57) ABSTRACT

Systems and methods for predicting virality of a content item are disclosed. A method includes: receiving a social network structure; identifying communities within the social network structure, where communities are identified as dense subnetworks in the social network structure; receiving social network content that includes one or more content items; and identifying one or more content items that are predicted to become viral based on utilization of the content items between different communities in the social network structure.

18 Claims, 8 Drawing Sheets

(56) References Cited

U.S. PATENT DOCUMENTS

| 8,725,858 B1* | 5/2014 | Wu .................... G06Q 30/0254 |
| | | 370/395.5 |
| 2012/0239489 A1 | 9/2012 | Peretti et al. |
| 2013/0041860 A1 | 2/2013 | Lawrence et al. |
| 2013/0232263 A1* | 9/2013 | Kelly ..................... H04L 43/10 |
| | | 709/224 |

OTHER PUBLICATIONS

Hong et al., Predicting Popular Messages in Twitter, 2011, ACM, WWW 2011, pp. 57-58 (Year: 2011).*
United States Patent and Trademark Office, International Search Report in International Application No. PCT/US2014/024062 (dated Aug. 1, 2014).
United States Patent and Trademark Office, Written Opinion in International Application No. PCT/US2014/024062 (dated Aug. 1, 2014).
International Bureau of WIPO, International Preliminary Report on Patentability in International Application No. PCT/US2014/024062 (dated Sep. 24, 2015).

* cited by examiner (a) #TheWorseFeeling (b) #IAdmit (c) #ProperBand (d) #FollowFool

| $n$ | $\lceil \log |T| + 0.5 \rceil$ | | | | $\lceil \log |A| + 0.5 \rceil$ | | | | |
|---|---|---|---|---|---|---|---|---|---|
| | 1 | 2 | 3 | ≥4 | 0 | 1 | 2 | 3 | ≥4 |
| 25 | 2,853 | 6,227 | 224 | 48 | 157 | 5,202 | 3,810 | 149 | 33 |
| 50 | - | 2,761 | 224 | 48 | 21 | 723 | 2,106 | 149 | 33 |
| 100 | - | 676 | 224 | 48 | 4 | 118 | 643 | 149 | 33 |

FIG. 5

SYSTEMS AND METHODS FOR PREDICTING MEME VIRALITY BASED ON NETWORK STRUCTURE

CROSS-REFERENCE TO RELATED PATENT APPLICATIONS

This patent application is the U.S. national phase of International Patent Application No. PCT/US2014/024062, filed on Mar. 12, 2014, which claims the benefit of U.S. provisional Patent Application No. 61/783,615, filed on Mar. 14, 2013, the disclosure of which is hereby incorporated by reference in its entirety.

STATEMENT REGARDING FEDERALLY SPONSORED RESEARCH OR DEVELOPMENT

This invention was made with government support under 1101743 and 0910812 awarded by the National Science Foundation. The Government has certain rights in the invention.

BACKGROUND

A "meme" is a piece of transmissible information that can replicate among people. The emergence of the Internet and wide adoption of online social networks not only brings about many Internet memes, but also provides an abundance of data on the spreading of memes and user behavior. Although numerous memes are created every day, only a few memes "go viral," characterized by mass dissemination of an item on the Internet or other media. Such mass dissemination is called viral because of the similarity to how actual viruses are spread among people. With viral memes, one person shows the item in question to his or her contacts, who then show it to their contacts, and so on. The item can refer to emails, videos, pictures, or anything else that propagates among user groups based on its popularity.

Predicting whether a meme will go viral has attracted attention across various disciplines, including marketing, advertising, social media analysis, and many other disciplines. One conventional approach to predicting meme virality detects early popularity and predicts future popularity based on the early popularity. However, this approach does not provide an accurate prediction of meme virality.

SUMMARY

One embodiment provides a method for predicting virality of a content item. The method includes: receiving a social network structure; identifying communities within the social network structure, where communities are identified as dense subnetworks in the social network structure; receiving social network content that includes one or more content items; and identifying one or more content items that are predicted to become viral based on utilization of the content items between different communities in the social network structure.

Other embodiments include a computer-readable storage medium and system configured to implement the method for predicting virality of a content item.

BRIEF DESCRIPTION OF THE DRAWINGS

FIG. 5 is a table showing different values of a number of exposures of a meme based on the order of magnitude of the total popularity according to a number of exposures and a number of adopters, according to one embodiment.

DETAILED DESCRIPTION

Figure 1:
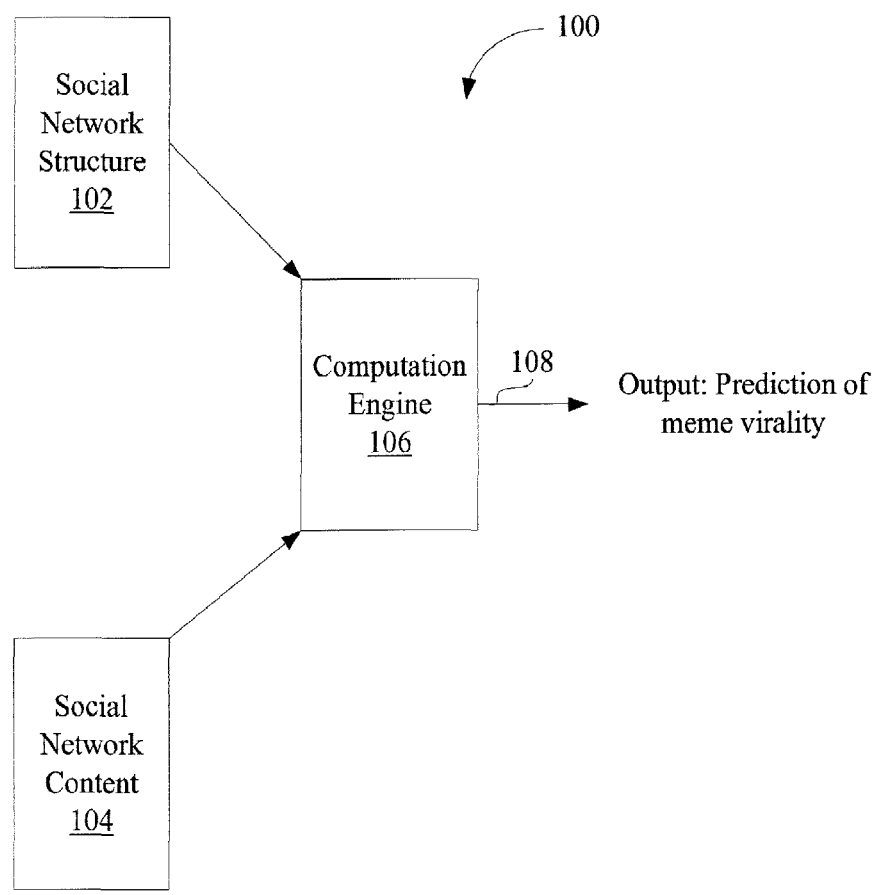
FIG. 1 is a conceptual diagram of a system for predicting meme virality, according to one embodiment of the disclosure.

Embodiments of the disclosure provide systems and methods for predicting viral memes using their early spreading patterns in the underlying social networks. Embodiments of the disclosure analyze a comprehensive set of features and develop an accurate model to predict future popularity of a meme given its early spreading patterns.

Embodiments of the disclosure predict meme virality based on one or more groups of data including but not limited to influence of early adopters, community concentration, and/or characteristics of adoption time series. Embodiments of the disclosure find that an analysis based on community structure is the most powerful predictor of future virality of a meme. Embodiments of the disclosure also find that early popularity of a meme is not necessarily a good predictor of its future popularity, contrary to common belief. Embodiments of the disclosure excel at detecting very popular or very unpopular memes.

As described, a meme is a piece of content information that replicates among people. Memes bear many similarities to infectious diseases, as both travel through social ties from one person to another. Examples of memes include, but are not limited to: images, videos, webpages, metadata (such as Twitter "hashtags"), phrases, sentences, names of people, etc.

The wide adoption of online social networks not only makes Internet memes possible, but also provides valuable data on the spreading of memes and user behavior. Although numerous memes are created every day, only a few of those memes go viral. Memes that go viral are characterized by mass dissemination of the corresponding item on the Internet or other media. Such mass dissemination is called viral because of the similarity to how actual viruses are spread.

In one example, a meme may become viral simply because the meme appeals to many people. At the same time, given the competition between memes and social influence, innate appeal alone may not be able to fully predict meme virality. As described in greater detail herein, according to various embodiments, the virality of a meme may also depend on timing, network structure, randomness, and many other factors.

Embodiments of the disclosure identify two approaches to meme virality prediction. The first includes a time series analysis, and the second utilizes feature-based classification. Time series analyses focus on the patterns of early popularity fluctuation of a meme under the assumption that patterns of a meme's popularity growth and decay are an indication of whether the meme will go viral in the future. Feature-based classification approaches aim to discover distinguishing features of viral memes by applying supervised machine learning techniques with labeled datasets. A variety of features have been proposed and tested to differentiate viral memes from others. Examples include comments, votes, and user-defined groups. However, prior approaches have paid little attention to the role of the underlying network structure to predicting whether a meme will become viral.

Embodiments of the disclosure demonstrate that meme virality can be predicted based on network structure, particularly based on communities (defined in one implementation as densely connected clusters of people or users, which are referred to herein as "dense subnetworks").

First, embodiments of the disclosure adopt features that capture the audience size. In some embodiments, the neighbors of an individual in the network can be considered as his or her potential audience. For example, users with many "followers" or friends (i.e., links in the social network) are more influential than users having fewer followers. Second, embodiments of the disclosure examine the predictive power of community structure. Some embodiments determine that the spreading pattern of a meme across communities reveals the general appeal of the meme, and therefore the meme's likelihood of becoming viral. Third, embodiments of the disclosure analyze the speed of growth in early meme adoption.

As a result of such analysis, embodiments of the disclosure are configured and adapted to predict the popularity of memes (to an order of magnitude) after a certain period (e.g., 2 months) based on knowledge of only a small number of early instances of the meme. The model outperforms random guessing, majority guessing, and other conventional regression models that use early popularity or expected influence of early adopters for detecting the most viral memes.

The spread of memes is often considered as social contagion, which is commonly defined as the spread of information or behavior on social networks where an individual serves as the stimulus for the imitative actions of another. However, studies have shown that information contagion may spread differently from diseases, as multiple exposures can significantly increase the chances of adoption. The speed and ease of meme transmission is affected by characteristics of social ties. In some embodiments, strong and homophilous ties are considered to be more effective than weak ties for spreading messages, while weak ties are considered to transmit novel information.

According to various embodiments, as described herein, the structure of the underlying network has a significant impact on the spreading process of a meme. In the example used throughout this disclosure, a Twitter dataset is used, where Twitter "hashtags" are the memes that are tracked to predict virality. Twitter is one of the most popular micro-blogging platforms, offered by Twitter, Inc., where users post short posts called "tweets." Twitter provides a great opportunity to study the spread of memes because Twitter is one of the main platforms where Internet memes are generated and shared, and also because Twitter supplies a network structure, content of messages, spreading events, and ways to define memes concretely. Using a Twitter network and Twitter hashtags is merely an example, and embodiments of the disclosure are not limited thereto.

In one embodiment, between a pair of users (u, v), we consider three main types of interactions: (i) u can "follow" v to subscribe to tweets from v; (ii) u can "retweet" v's messages to re-broadcast the message to u's followers, commonly noted as "RT" for short; and (iii) u can "mention" v's screen name in tweets by using the "@" symbol (e.g. '@obama'). Users can also explicitly attach indexable topic identifiers to a tweet by using "hashtags," topical terms with the "#" symbol as a prefix (e.g. '#news').

Properties of hashtags are in line with the definition of memes because hashtags can be concretely identified and tracked. Most hashtags are unique phrases that clearly spread by imitation. Moreover, they mutate, compete, and survive—Twitter users quickly reach consensus on representative hashtags for certain topics. For instance, '#ows' quickly became the hashtag of the 'Occupy Wall Street' movement originating in 2011, outcompeting several similar labels, among hundreds of thousands of people who participated in public discourse around the movement.

Some embodiments of the disclosure use the Twitter Streaming API (Application Programming Interface) and the 'GET followers' method of the Twitter REST API, to collect tweets during a particular time frame and reconstruct a relevant portion of the follower network. In one example, embodiments of the disclosure only kept reciprocal follow links, as bi-directional communication reflects more stable and reliable social connections. In one implementation, non-English users may be filtered out to avoid any artifacts from the large-scale segregation between language groups.

FIG. 1 is a conceptual diagram of a system 100 for predicting meme virality, according to one embodiment of the disclosure. As shown, the system 100 includes a social network structure 102, social network content 104, and a computation engine 106.

In one example, the social network structure 102 is based on a relationship between people or users in a social network. The social network allows users to generate content and share the content with connected users. Many examples of social networks are within the scope of embodiments of the disclosure, including Facebook, Twitter, Instagram, Pinterest, Last.fm, Flickr, Picasa, among many others. Taking Twitter as an example, the social network structure may be based on following relationships, mentioning relationships, and/or retweeting relationships. In other examples, the social network is Facebook or Instagram, and the relationships are defined by Facebook "friends" or Instagram "followers," respectively. In the context of email, the social network structure 102 may be based on relationships between an email sender and an email recipient. Many other social network structures are within the scope of embodiments of the disclosure.

The social network content 104 can include any content that can be tracked within the social network. As a non-limiting example, in the context of Twitter, the social network content may be Twitter "hashtags."

In one embodiment, the social network structure 102 and the social network content 104 are received by a computation engine 106. The computation engine 106 may be embodied as hardware, software, and/or a combination of hardware and software. For example, the computation engine 106 may be executing on a computing device that includes one or more memories and one or more processors. The social network structure 102 and the social network content 104 are received by the computation engine 106 via network communication channels, which may be any type of network including a wired network, wireless network, cellular network, among others. As described in greater detail herein, the computation engine 106 is configured to predict the future virality 108 of certain social network content 104 based on the social network structure 102.

Figure 2A:
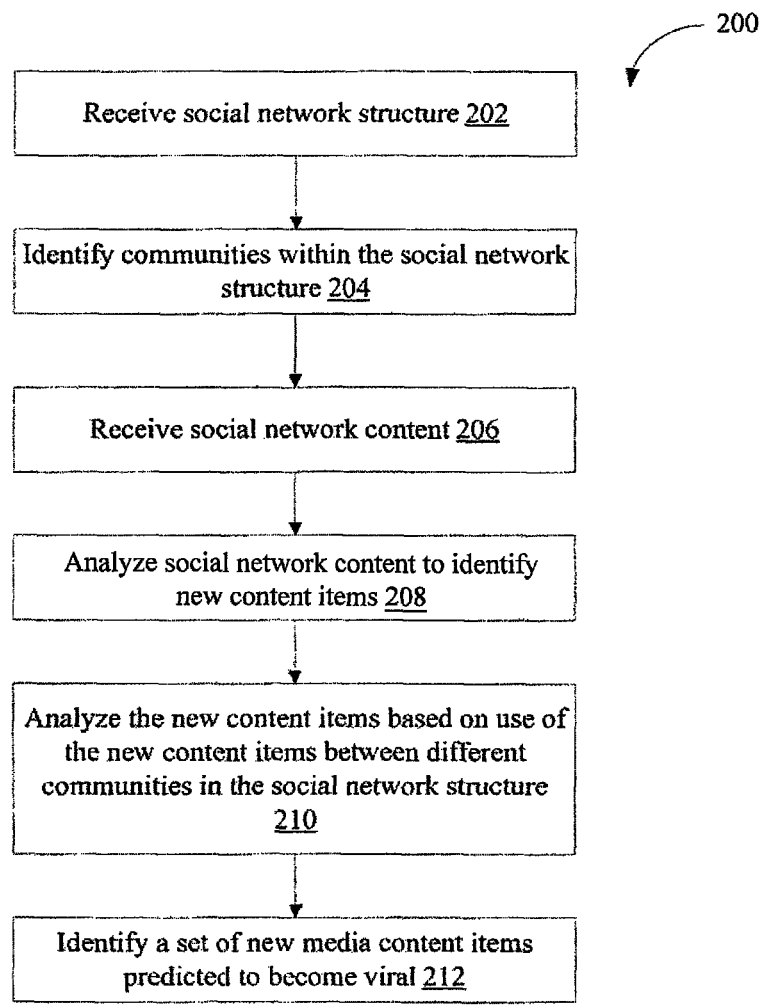
FIGS. 2A-2B comprise a flow diagram of method steps for predicting meme virality, according to one embodiment of the disclosure.

FIG. 2A is a flow diagram for a method of predicting meme virality according to one embodiment of the disclosure. As shown, the method 200 begins at step 202, where a computation engine, such as the computation engine 106 shown in FIG. 1, receives a social network structure. At step 204, the computation engine identifies communities within the social network structure. At step 206, the computation engine receives social network content.

In the example of the Twitter community, relationships between Twitter users comprise the social network structure and the tweets of the users comprise the social network content.

For example, each hashtag h in a tweet may be a meme. $T(h)$ is a set of all tweets that contain h. $T_n(h)$ is a set of the earliest n tweets that contain h. Thus, $T_n(h) \subseteq T(h)$ and $n=|T_n(h)| \leq |T(h)|$.

Similar definitions can be made for adopters. $A(h)$ is a set of all adopters who tweeted about h. $A_n(h) \subseteq A(h)$ is a set of early adopters who tweeted at least one of the first n tweets. The popularity of meme h is quantified by the number of tweets, $|T(h)|$, or adopters, $|A(h)|$.

The neighbors of a given set of users U (not counting U) are deemed to be U's 'surface' $S(U)$. The definition of the surface can be extended recursively to the k-th surface, which includes users within k steps from any user in the target set U, such that: $S^k(U)=S(S^{k-1}(U))\cup S^{k-1}(U)$ and $S^1(U)=S(U)$.

For a given meme h, some embodiments consider a sequence of meme adopters, $$\langle a_1^h, a_2^h, \ldots, a_{|T(h)|}^h \rangle,$$

where $a_i^h \in A(h)$ is the creator of i-th tweet of h. A user may appear multiple times in the sequence if the user tweets about h more than once. Similarly, some embodiments build a tweet time series $$\langle t_1^h, t_2^h, \ldots, t_{|T(h)|}^h \rangle,$$

where $t_i^h$ marks the timestamp (in seconds) of the i-th tweet including h. The sets of tweets within the time $\tau$ is labeled as $T^\tau(h)$, where $\tau$ is a time duration measured starting from the first tweet.

A community $c \in C$ is a subset of nodes (users) in the network. $T(h|c)$ and $A(h|c)$ are tweets and adopters of a meme h in community c, respectively. $T_n(h|c)$ and $A_n(h|c)$, which consider only early tweets, can be defined in a similar fashion. In one embodiment, communities are defined as clusters of nodes (e.g., subnetworks) that share a larger proportion of connections between nodes in the community than connections to nodes outside the community. In other embodiments, any community detection method may be used. For example, disjoint community detection methods (such as "InfoMap") and overlapping community detection methods (such as "Link Community") may be used to identify communities within the social network content.

In one implementation, the set of communities to which user u is assigned is $C_u=\{c|u\in C \wedge c\in C\}\subseteq C$. For an edge $(u,v)\in E, u,v \in V$ are two users connected by the edge. The set of intra-community edges is defined as $E_\leftrightarrow = \{(u,v)|C_u \cap C_v \neq \emptyset\}$ and inter-community edges belong to $E_\rightarrow=\{(u,v)|C_u \cap C_v = \emptyset\}$. Similarly, sets of intra- and inter-community edges can be defined for a single community c:

$$E_\leftrightarrow^c = \{(u,v)|(u,v)\in E_\leftrightarrow \wedge c_u=c_v=c\}$$

and $$E_\leftrightarrow^c = \{(u,v)|(u,v)\in E_\rightarrow \wedge (c_u=c \vee c_v=c)\}.$$

In one implementation the weight of an edge $(u,v)$, $w(u,v)$, is defined by the frequency of u retweeting ("RT") or mentioning ("@") v, noted as $w^{RT}(u,v)$ or $w^@(u,v)$, respectively. For a community c, the average edge weights of intra- and inter-community links are defined, respectively, by the equations:

$$\langle w_\leftrightarrow \rangle_c = \frac{1}{|E_\leftrightarrow^c|} \sum_{(u,v)\in E_\leftrightarrow^c} w(u,v)$$

and $$\langle w_\rightarrow \rangle_c = \frac{1}{|E_\rightarrow^c|} \sum_{(u,v)\in E_\rightarrow^c} w(u,v).$$

In some embodiments, random walks on a graph tend to get trapped inside densely connected components, as has been employed in many community detection methods. Even if a community does not consist of homophilous people or stronger links, the spreading of a meme can be trapped within communities, driven by dense internal connections, i.e., in dense subnetworks.

For example, to estimate the structural trapping effect of communities, consider a random walker traversing the graph. The basic assumption is that if information spreads randomly through links and there is an infinite number of spreading events (i.e., treating every node and link equally), the probability that a given link is used in the transmission of information will approach the probability that the random walker traverses the link. The probability of the random walker moving from a node u to another connected node v given the walker is at u is $p_{u\rightarrow v}=1/k(u)$, where $k(u)$ is the degree of u. We can construct a transition matrix P, where each cell $p_{u\rightarrow v}=1/k(u)$ if u and v are connected, and $p_{u\rightarrow v}=0$ otherwise. The stationary probability of the walker stopping at a node u is the element $\pi_u$ of a vector $\pi$ such that $P^T\pi=\pi$. In one implementation, $\pi_u=k(u)/\Sigma_v k(v)$. The expected amount of communication carried by edge $(u,v)$, considering structural trapping but without any homophily or social reinforcement effects, can be computed by the probability $w^{rw}(u,v)$ of the random walker traveling through the edge by using the equations:

$$w^{rw}(u,v) = \pi_u p_{u\rightarrow v} + \pi_v p_{v\rightarrow u}$$

$$w^{rw}(u,v) = \frac{k(u)}{\sum_m k(m)}\frac{1}{k(u)} + \frac{k(v)}{\sum_m k(m)}\frac{1}{k(v)}$$

$$w^{rw}(u,v) = \frac{2}{\sum_m k(m)} \sim const.$$

As such, in this example implementation, a random walker, or a random spreading event, traverses each edge with the same probability. This expectation is in contrast with the empirical edge weights from the follower network. For example, because the retweet and mention networks are extracted from activity, the definition of edge weights on these networks is somewhat circular and thus biased. Note that the community structure is detected from the unweighted network, capturing only topological property of the networks.

For each individual u in a community, we compare the fraction of their average activity (for example, retweets or mentions) with each other person in the same community, $f_{\leftrightarrow}$, and the fraction of average activity with each person in a different community, $f_{\rightarrow}$:

$$f_{\leftrightarrow}(u) = \frac{\frac{1}{k_{\leftrightarrow}(u)}\sum_{(u,v)\in E_{\leftrightarrow}} w(u,v)}{\frac{1}{k(u)}\sum_{(u,v)\in E} w(u,v)},$$

$$f_{\rightarrow}(u) = \frac{\frac{1}{k_{\rightarrow}(u)}\sum_{(u,v)\in E_{\rightarrow}} w(u,v)}{\frac{1}{k(u)}\sum_{(u,v)\in E} w(u,v)}$$

where $k_{\leftrightarrow}(u)$ and $k_{\rightarrow}(u)$ are the numbers of u's intra- and inter-community links:

$$k_{\leftrightarrow}(u) = |\{v|(u,v)\in E_{\leftrightarrow}\}|$$

$$k_{\rightarrow}(u) = |\{v|(u,v)\in E_{\rightarrow}\}|$$

$$k(u) = k_{\leftrightarrow}(u) + k_{\rightarrow}(u).$$

The ratios $f_{\leftrightarrow}$ and $f_{\rightarrow}$ characterize how attention is directed toward a person within the same community versus a person in another community. Using the random walk analogy, the user community focus represents the probability of a random walker from a node traveling through each of its links. By definition, the random walker does not distinguish links, and thus $f_{\leftrightarrow}^{rw} = f_{\rightarrow}^{rw} = 1$. Again, certain embodiments measure the user community focus in the follower network to avoid circular definitions in the retweet and mention networks. In one implementation $f_{\leftrightarrow} > 1 > f_{\rightarrow}$ on average, indicating that people communicate more with neighbors in the same community. The results are robust across different activity measures and communities, and the differences are statistically significant.

Examples of communities include: users who attended the same school, users who work at the same place, users who like basketball, users who live in Indiana, etc. In general, communities include groups of users that share interests to a greater extent among each other than they do with the global population.

C(h) denotes the 'infected communities' of h, which are communities with at least one tweet containing h. $C(h) = \{c|c \in C, |T(h|c)| \geq 1\}$. Similarly, the infected communities with early tweets are $C_n(h) = \{c|c \in C(h), |T_n(h|c)| \geq 1\}$.

I(h) is the number of user interactions regarding h. For example, two types of user interactions may be considered: 'retweets' (RT), by which a user retweets a message containing h from another user; and 'mentions' (@), by which a user mentions another user in an tweet containing h. Some embodiments consider interactions within communities, $I^{\leftrightarrow}(h)$, and interactions between communities, $I^{\rightarrow}(h)$, respectively, where $I(h) = I^{\leftrightarrow}(h) + I^{\rightarrow}(h)$.

At step 208, the computation engine analyzes social network content to identify new content items. To ensure that the embodiments described herein examine only new memes, hashtags that were first used during the first two weeks of a given month and appear in fewer than X tweets during the previous month are considered. For example, X=20.

At step 210, the computation engine analyzes the new content items based on, at least, utilization of the new content items between different communities in the social network structure. Addition detail regarding step 210 is provided in FIG. 2B, described below.

Various embodiments identify signatures of viral memes at their early stages in terms of three characteristics: network topology, community diversity, and growth rate. Some embodiments determine that the information of early adopters, particularly in the context of social network structure, is powerful enough to identify young viral memes.

Figure 3A:
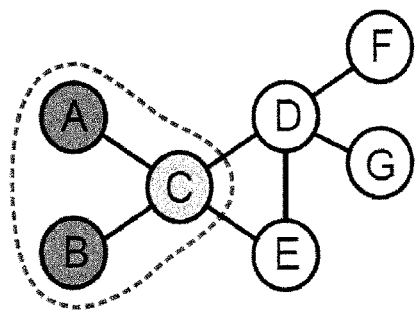
FIGS. 3A-3B illustrate that network surface variance based on degree and position of meme adopters in accordance with various embodiments of the disclosure.
Figure 3B:
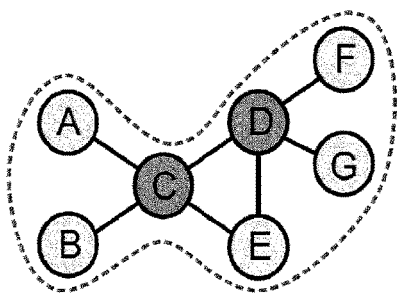

For example, the position of an adopter in the network determines the size of the potential audience. The network surface of a given set of adopters, S, captures the number of neighbors who are directly exposed. FIGS. 3A-3B illustrate that the network surface varies depending on the degrees and positions of the adopters, according to various embodiments. In FIG. 3A, users A and B adopted a meme. Thus, the network surface includes users A, B, and C. In FIG. 3B, users C and D adopted a meme. Thus, the network surface includes users A, B, C, D, E, F, and G.

Figure 3C:
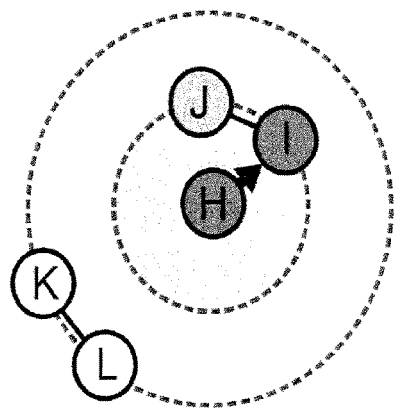
FIGS. 3C-3D compare the potential adopters of two spreading events, according to various embodiments.
Figure 3D:
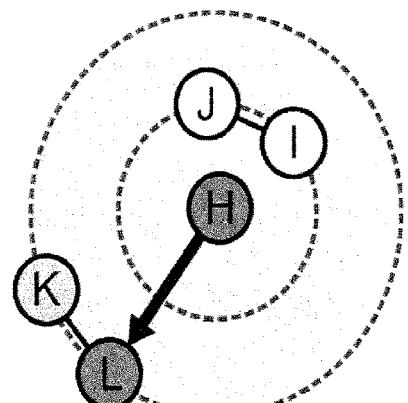

Some embodiments also estimate the growth of potential audience in time by examining the distance between consecutive adopters in the network. Note that new adopters are not necessarily connected to existing adopters because a meme can be injected into multiple nodes of the network and because data collection is based on a sample of the entire public stream. The longer the jump between two consecutive adopters, the more potential spreaders the meme may have. FIGS. 3C-3D compare the potential adopters of two spreading events, according to various embodiments. FIG. 3C illustrates a short-range diffusion from user H to user I; whereas, FIG. 3D illustrates a long-range diffusion from user H to user L.

According to various embodiments, unlike epidemic diseases, social contagions are known to possess two distinctive characteristics: social reinforcement and homophily. With social reinforcement, until a certain point, each additional exposure drastically increases the probability of adoption. With homophily, social relationships are more likely to be formed between people who share certain characteristics, captured in the sayings "birds of a feather flock together" and "similarity breeds connection." Therefore, connected people have similar characteristics, such as interests, languages, or culture, etc., increasing the chances of adopting similar memes.

Further, according to some embodiments, community structure has been shown to help quantify the strength of these effects by the following mechanisms. First, dense connectivity inside a community, i.e., in dense subnetworks, increases the chances of multiple exposures, thus enhancing the contagion that is sensitive to social reinforcement. Second, groups with similar tastes naturally establish more edges among them, forming communities. Therefore, members of the same community are more likely to share similar interests. If these two effects are strong, communities will facilitate the internal circulation of memes, while preventing diffusion across communities, causing strong concentration or low community diversity. For example, unpopular memes tend to be concentrated in a small number of communities, while the few viral memes have high community diversity, spreading widely across communities like epidemic outbreaks. Therefore, features that quantify the community diversity help predict future meme virality.

Figure 4A:
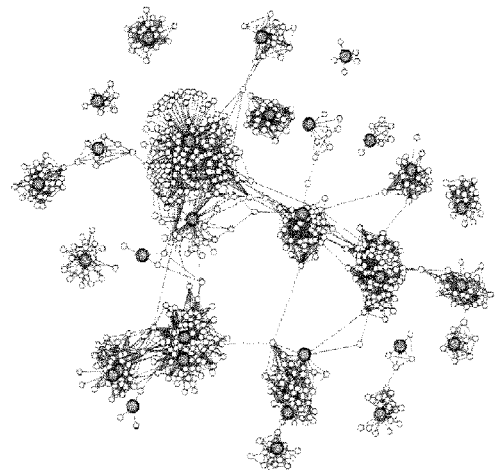
FIGS. 4A-4D illustrate early diffusion patterns of a few memes based on the first 30 exposures, according to various embodiments.
Figure 4B:
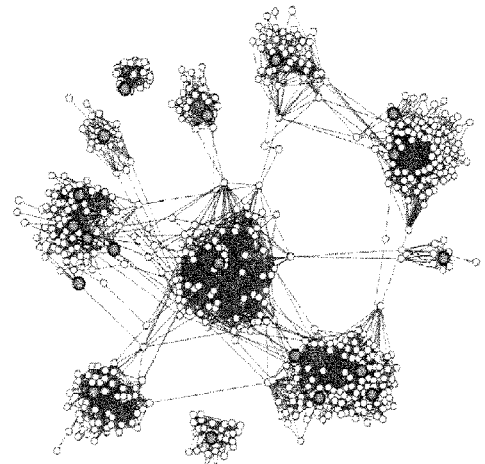
Figure 4C:
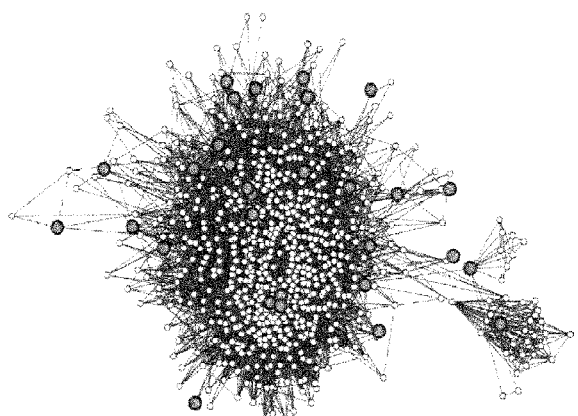
Figure 4D:
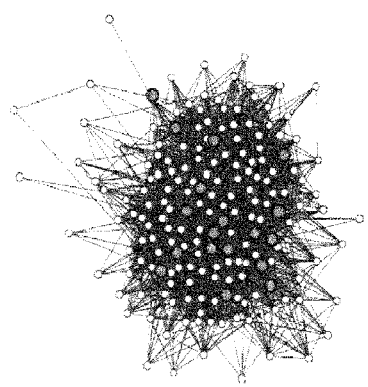

As an example, early diffusion patterns of a few memes based on the first 30 tweets are visualized in FIGS. 4A-4D. As shown in FIGS. 4A-4B, viral hashtags such as #TheWorseFeeling and #IAdmit exhibit more community diversity than non-viral memes, such as #ProperBand and #FollowFool, as shown in FIGS. 4C-4D.

In addition, viral memes are expected to spread more quickly than other memes. To incorporate this intuition, some embodiments define the time difference between the first and the n-th tweet in the time series of a meme h as the early spreading time, $$t_n^h - t_1^h.$$

Early spreading time gauges the initial growth rate of n. According to one embodiment, there are only a very small number of memes that go viral after a certain observation window, for example, two months. Although embodiments observe some fluctuations when the early spreading time is small, meme popularity significantly decreases when the early spreading is slow.

Figure 2B:
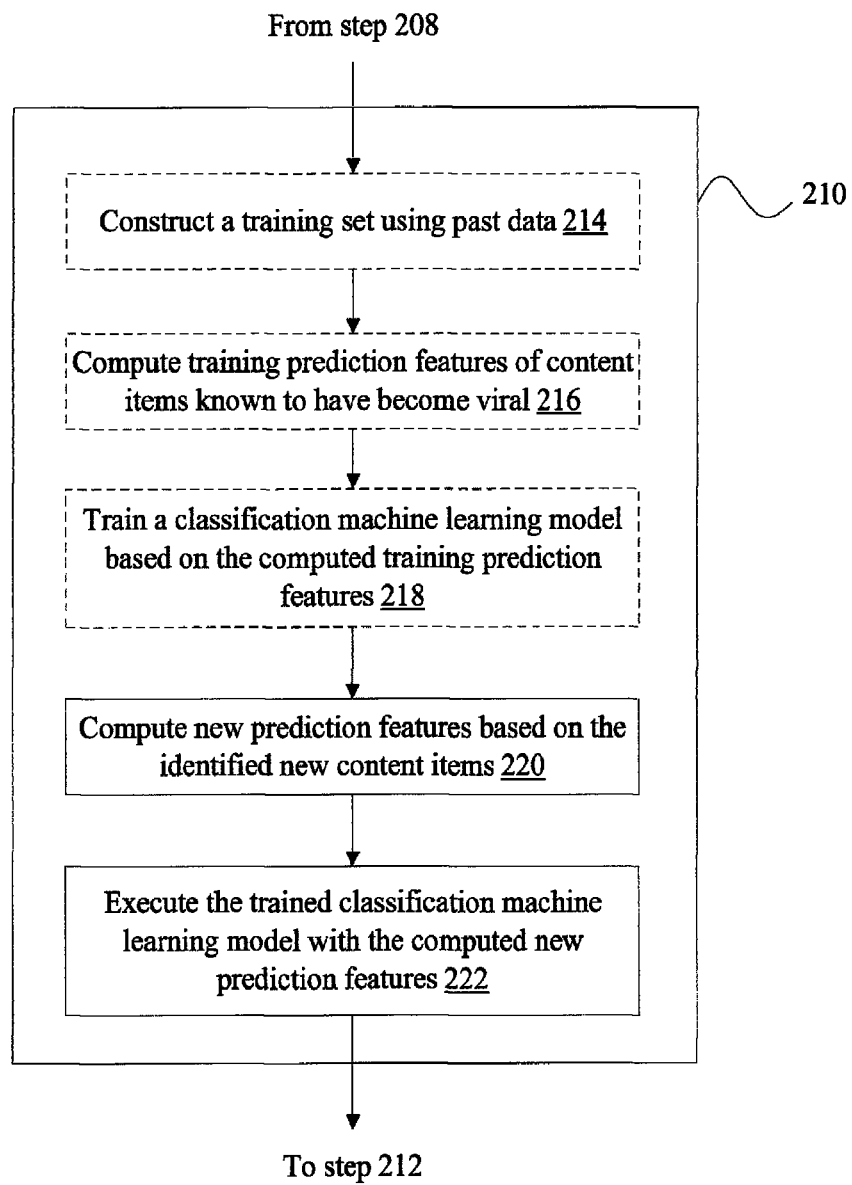

FIG. 2B is a flow diagram of method steps for predicting meme virality, according to one embodiment of the disclosure. In one embodiment, the flow diagram shown in FIG. 2B provides additional detail and substeps of step 210 shown in FIG. 2A.

At step 214, the computation engine constructs a training set using past data. For example, the past data may include historical social network structure and historical social network data. The past data also includes content items that are known to have become viral. These known content items can be used to train a classification machine learning model, as described in greater detail below.

At step 216, the computation engine computes training prediction features of content items known to have become viral. Embodiments of the disclosure define several different "features" to be used in a prediction model. "Network features" describe the size of potential audience based on the positions of early adopters in the network. "Community features" measure the community diversity at the early stage. "Growth-rate features" quantify the initial momentum.

In one exemplary implementation, thirteen different "features" are considered, marked as f.1-13. Continuing with the Twitter hashtag example, each feature f.1-13 is computed based on the first n tweets for each hashtag, where the parameter n is a relatively small number compared to the final number of tweets generated by viral hashtags.

Features f.1-3 are basic network features that are based on the connectivity of users.

f.1. Number of early adopters, $|A_n(h)|$. Among the earliest n tweets of a meme h, it refers to the set of distinct adopters. The number of early adopters is one of the most basic and simple features. A small $|A_n(h)|$ would indicate that a small number of users generated the most tweets and the hashtag is failing to spread.

f.2. Size of first surface, $|S(A_n(h))|$. The first surface contains all the uninfected neighbors of early adopters of h. It is a set of the most immediate adopter candidates.

f.3. Size of second surface, $|S^2(A_n(h))|$. The second surface includes uninfected users in the second surface of early adopters, characterizing the number of potential adopters within two steps.

Features f.4-6 are distance features that are based on the position of adopters in the network.

f.4. Average step distance, $\overline{d_n(h)}$. With the adopter sequence for the first n tweets of h, $\{a_1^h, a_2^h, \ldots, a_n^h\}$, we measure the distance (shortest network path length) between consecutive users $(a_t^h, a_{t+1}^h)$ and call it step distance, $d(a_t^h,$ $a_{t+1}^h)$, where $1 \leq i \leq n-1$. One embodiment examines the average distance between consecutive adopters of h in time using the following equation:

$$\overline{d_n(h)} = \frac{1}{n-1}\sum_{i=1}^{n-1} d(a_i^h, a_{i+1}^h)$$

f.5. $C_v$ of step distances, $C_v(d_n(h))$. The coefficient of variation ($C_v$) of a variable is the ratio of its standard deviation to the mean. The relative variability in step distance can be measured using the equation:

$$C_v(d_n(h)) = \frac{1}{n-1}\sqrt{\frac{\sum_{i=1}^{n-1}(d(a_i^h, a_{i+1}^h) - \overline{d_n(h)})^2}{n-2}}$$

f.6. Diameter, $D_n(h)$. The diameter is the maximum distance between any two adopters of h within the first n tweets. It is a measure of audience coverage in the network using the equation:

$$D_v(h) = \max_{1 \leq i \neq j \leq n-1} d(a_i^h, a_j^h)$$

Features f.7-11 are community-based features. Community-based features are designed on the premise that viral memes exhibit high community diversity. The features are computed at prediction time, based on the predefined communities; the community detection algorithm is executed once on the network built upon the historical data, as the network structure does not evolve much within a short time period.

f.7. Number of infected communities, $|C_n(h)|$. This feature is the number of communities with at least one adopter of h among first n tweets.

f.8-9. Usage and adopter entropy, $H_n^T(h)$ and $H_n^A(h)$. The measurement of entropy describes how tweets or adopters of a given meme are scattered or concentrated across communities. Large entropy indicates high diversity and low concentration, according to the following equations:

$$H_n^T(h) = -\sum_{c \in C(h)} \frac{|T_n(h|c)|}{n} \log \frac{|T_n(h|c)|}{n}$$

$$H_n^A(h) = -\sum_{c \in C(h)} \frac{|A_n(h|c)|}{|A_n(h)|} \log \frac{|A_n(h|c)|}{|A_n(h)|}$$

f.10-11. Fraction of intra-community user interaction, $$\frac{I_n^{\leftrightarrow}(h)}{I_n(h)}.$$

The likelihood of a user adopting information from members of the same community increases with the strength of the community trapping effect. The initial expectation was that weaker community trapping and higher community diversity would be good viral indications for early adopters of viral memes. This was quantified by measuring the fraction of intra-community user interaction. For example, the interactions can be retweets or mentions using the following equations, respectively:

$$\frac{I_n^{\leftrightarrow RT}(h)}{I_n^{RT}(h)}, \frac{I_n^{\leftrightarrow @}(h)}{I_n^{@}(h)}$$

where a high fraction of intra-community interaction suggests a limited group of potential adopters in the future.

Features f.12-13 are growth rate features. Given the time series of the first n tweets of a meme h, $\{t_1^h, t_2^h, \ldots, t_n^h\}$, step time duration can be measured, which is an indication of a time difference between consecutive tweets, $t_{t+1}^h - t_t^h$. The mean and fluctuations of the sequence of time durations are implemented as two prediction features.

f.12. Average step time duration, using the equation:

$$\overline{\Delta t_n(h)} = \frac{\sum_{i=1}^{n-1} t_{i+1}^h - t_i^h}{n-1} = \frac{t_n^h - t_1^h}{n-1}$$

f.13. $C_v$ of step time durations, using the equation:

$$C_v(\Delta t_n(h)) = \frac{1}{\overline{\Delta t_n(h)}} \sqrt{\frac{\sum_{i=1}^{n-1} (t_{i+1}^h - t_i^h - \overline{\Delta t_n(h)})^2}{n-2}}$$

In some embodiments, the popularity or virality of a meme h is defined as the number of tweets |T(h)| or adopters |A(h)|. Both definitions are used in the evaluation, as they highlight different perspectives of a meme: the former characterizes the amount of discussion a meme triggers; the latter informs about the size of the crowd participating in the discussion. Large T(h) does not necessarily implies large A(h), because a single user may generate many tweets. Meme popularity exhibits a broad and skewed distribution, as observed in many previous studies. Some embodiments partition all the memes into several classes based on the order of magnitude of the total popularity as:

⌈ $\log_{10}|T|+0.5$ ⌉ or ⌈ $\log_{10}|A|+0.5$ ⌉

The prediction task is therefore a multi-label classification. Given the information about the early stage of a hashtag, some embodiments predict which class a meme belongs after about two months, which in one example is the end of the observation period of samples in a dataset.

As described above, at step 216, the computation engine computes training prediction features of content items known to have become viral. For example, each of features f.1-11, described above, can be computed for the content items known to have become viral.

At step 218, the computation engine trains a classification machine learning model based on the computed training prediction features. In one embodiment, the model used to predict virality according to embodiments of the disclosure is referred to a "Network-based Prediction Model" ($P_n$). One implementation may utilize the random forest algorithm, which has been shown to be robust and reliable. In one implementation of the random forest algorithm, we construct 300 decision trees, each having 5 random features f.1-13, described above. Our prediction model $P_n$ uses the features computed with the first n tweets of each meme. In one implementation, hashtags with fewer than n tweets are not considered in the calculation. We experiment with different values of n, including n=25, 50, or 100. The corresponding number of memes in each class are shown in FIG. 5. The random forest algorithm is merely one example of the model implementation, and other models are also within the scope of embodiments of the disclosure.

As described above, at step 220, the computation engine computes new prediction features based on the identified new content items. In one example, new content items are identified in step 208, described above in FIG. 2A. As described, to ensure that the embodiments described herein examine only new memes, certain embodiments only include the hashtags that were used during the first two weeks of a given month and appeared in fewer than X tweets during the previous month. For example, X=20. In one implementation, each of features f.1-11, described above, can be computed for the new content items.

At step 222, the computation engine executes the trained classification machine learning model with the computed new prediction features.

The steps 214, 216, and 218 are shown in FIG. 2B using dashed lines because, in some embodiments, steps 214, 216, and 218 are optional and may be omitted. For example, if the classification machine learning model has been previously "trained," then there may not be a need to re-train the model. Also, in some embodiments, the classification machine learning model be continuously re-trained based on the results of further computations and results.

Referring again to FIG. 2A, at step 212, the computation engine identifies a set of new media content items predicted to become viral. For example, the set of new media content items predicted to become viral is based on the results of executing the trained classification machine learning model with the computed new prediction features.

In sum, embodiments of the disclosure implement several prediction features based on these intuitions and analyses, and test them with machine learning techniques. The disclosed prediction model outperforms conventional approaches, especially for predicting memes in minor, but crucial classes. The performance is robust across different community detection methods. Community-based features perform the best among the three classes. Predicting the number of meme adopters is a more difficult task, but our network-based approach outperforms other conventional approaches, especially in predicting memes with few adopters. The performance increases with longer observation windows.

In some embodiments, simply computing the accuracy (i.e., the percentage of correctly predicted items among all the items) is insufficient for evaluation in a prediction task because the classes in said task may be imbalanced (see, FIG. 5). When class sizes are skewed, a high accuracy does not necessarily indicate good performance. Overlooking small classes can yield good accuracy if one or a few dominant classes are over-represented in the dataset.

Instead, certain embodiments measure both precision and recall for each class to demonstrate the model performance for predicting viral and non-viral memes separately. 'Precision' quantifies how many predicted items for the target class are correct in the empirical data. 'Recall' measures how many actual items in the target class are captured by the model. Precision and recall are combined by the harmonic mean $F_1$:

$$F_1 = 2 \cdot \text{precision} \cdot \frac{\text{recall}}{\text{precision} + \text{recall}}$$

between 0 (worst) and 1 (best). For the disclosed model $P_n$, some embodiments employ 10-fold cross validation. To quantify and compare how each set of features in $P_n$ performs, we also run the models with only basic network features (f.1-3), distance features (f.4-6), community-based features (f.7-11), and timing features (f.12-13).

Advantageously, the Network-based Prediction Model ($P_n$) outperforms conventional approaches to predicting meme virality, especially for the most viral hashtags, where $\lceil \log_{10}|T|+0.5 \rceil \geq 4$ or $\lceil \log_{10}|A|+0.5 \rceil \geq 4$; or hashtags with a small number of adopters, where $\lceil \log_{10}|A|+0.5 \rceil \leq 1$.

In some implementations, baste network features (f.1-3) are weak for viral memes, but sufficient to define dominant classes. Timing-based features (f.12-13) were found to be more effective for estimating future usage, while distance-based features (f.4-6) are more helpful for predicting the number of adopters. In some implementations, community-based features (f.7-11) yield the best results in general, particularly when detecting the classes of very popular memes. By combining all the features (f.1-13) together, $P_n$ provides the best overall results. As such, embodiments of the disclosure show that the network-based approach $P_n$ excels in detecting memes of minor classes—extremely popular hashtags or extremely unpopular ones.

In summary, embodiments of the disclosure are able to predict the future popularity of a meme with three intuitive classes of features. First, the positions of early adopters in the network provide information on the size of potential audience groups, which affect the future popularity. Second, community diversity is a good predictor of virality, consistently with prior findings that viral memes are less affected by community structure. Finally, the early growth rate of a meme usage can be extrapolated to predict its future popularity, although the predictive power is not as strong as that of other features.

The ability to predict whether a meme can go viral by just observing a few early messages provides many potential applications in social media analytics, marketing, and advertisement. Embodiments of the disclosure provide not only novel and powerful features for predicting meme virality.

Figure 6:
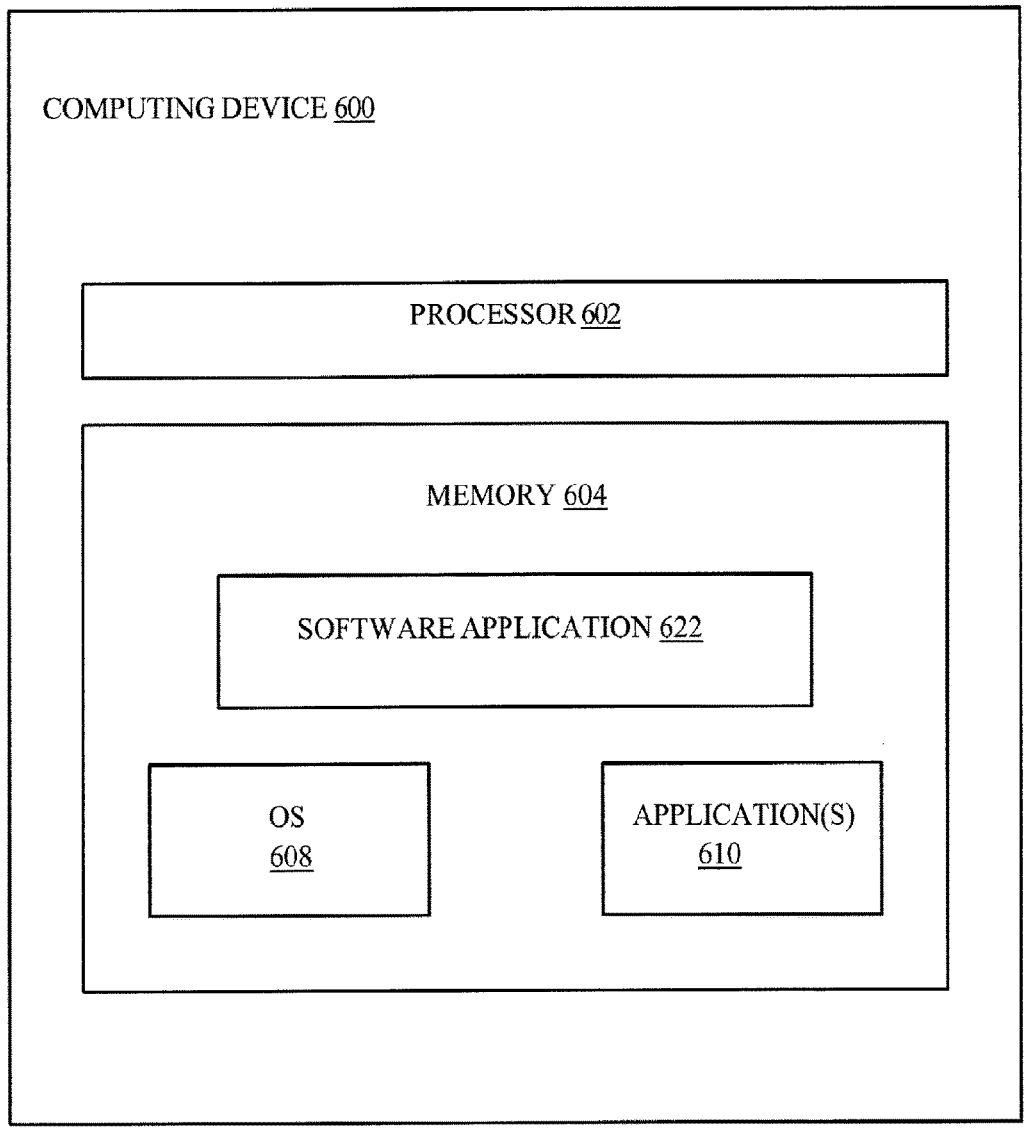
FIG. 6 is a block diagram of the arrangement of components of an example computing device, according to an example embodiment.

FIG. 6 is a block diagram of the arrangement of components of an example computing device 600, according to an example embodiment. The example computing device 600 shown in FIG. 6 may comprise a computing device for implementing the computation engine 106 in FIG. 1. As shown, computing device 600 includes a processor 602 and memory 604, among other components (not shown).

The memory 604 includes various applications that are executed by processor 602, including installed applications 610, an operating system 608, and software application 622. In embodiments where the computing device 600 comprises a computing device for implementing the computation engine 106, the software application 622 comprises a meme virality prediction application. Some implementations execute the method 200 daily, weekly, or continuously.

Figure 7:
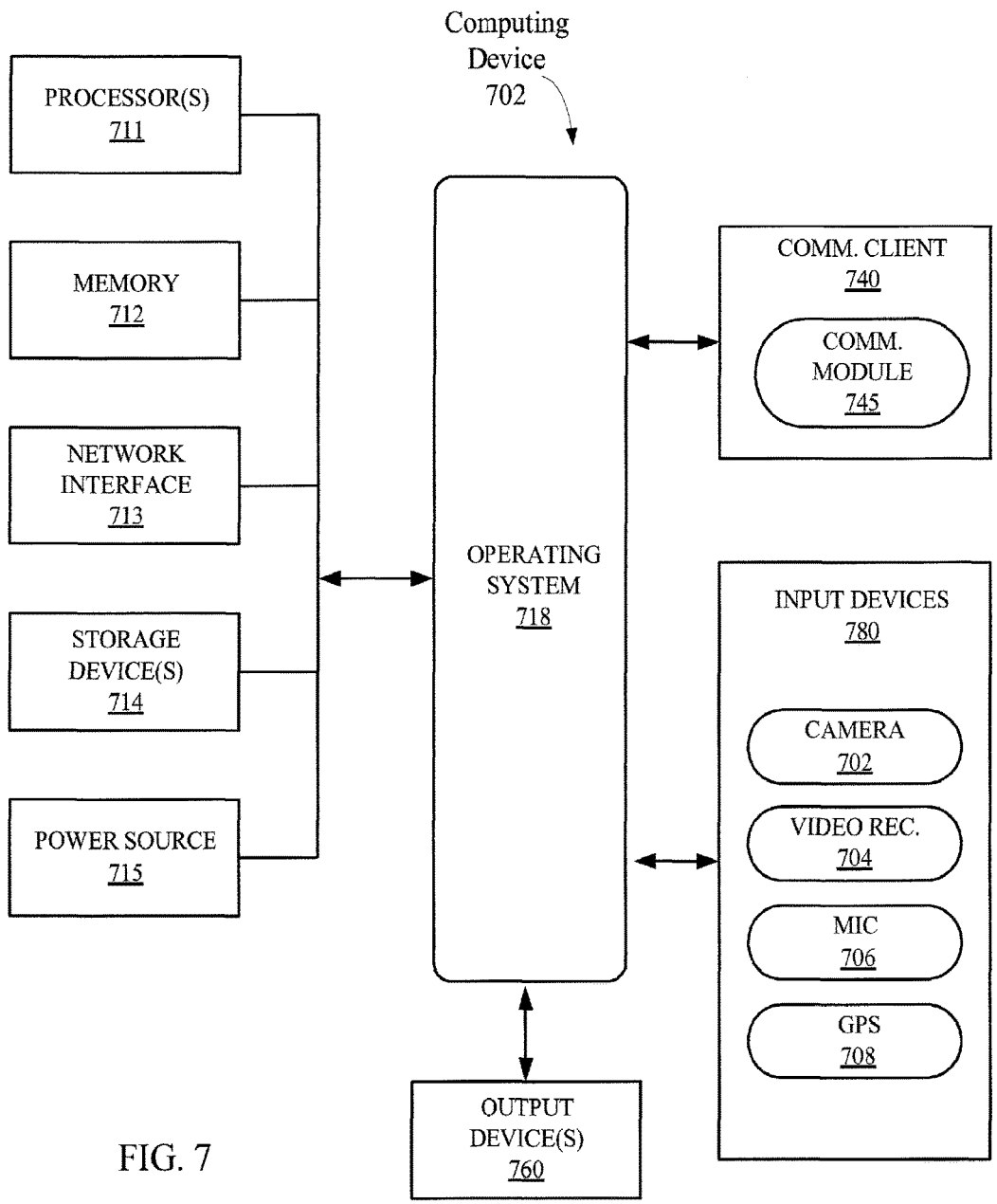
FIG. 7 is a block diagram of example functional components for a computing device, according to one embodiment.

FIG. 7 is a block diagram of example functional components for a computing device 702, according to one embodiment. The example computing device 702 shown in FIG. 7 may comprise a computing device for implementing the computation engine 106 in FIG. 1. One particular example of computing device 702 is illustrated. Many other embodiments of the computing device 702 may be used.

In the illustrated embodiment of FIG. 7, the computing device 702 includes one or more processor(s) 711, memory 712, a network interface 713, one or more storage devices 714, a power source 715, output device(s) 760, and input device(s) 780. The computing device 702 also includes an operating system 718 and a communications client 740 that are executable by the computing device 702. Each of components 711, 712, 713, 714, 715, 760, 780, 718, and 740 is interconnected physically, communicatively, and/or operatively for inter-component communications in any operative manner.

As illustrated, processor(s) 711 are configured to implement functionality and/or process instructions for execution within computing device 702. For example, processor(s) 711 execute instructions stored in memory 712 or instructions stored on storage devices 714. Memory 712, which may be a non-transient, computer-readable storage medium, is configured to store information within computing device 702 during operation. In some embodiments, memory 712 includes a temporary memory, area for information not to be maintained when the computing device 702 is turned OFF. Examples of such temporary memory include volatile memories such as random access memories (RAM), dynamic random access memories (DRAM), and static random access memories (SRAM). Memory 712 maintains program instructions for execution by the processor(s) 711.

Storage devices 714 also include one or more non-transient computer-readable storage media. Storage devices 714 are generally configured to store larger amounts of information than memory 712. Storage devices 714 may further be configured for long-term storage of information. In some examples, storage devices 714 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 702 uses network interface 713 to communicate with external devices via one or more networks. Network interface 713 may be a network interface card, such as an Ethernet card, an optical transceiver, a radio frequency transceiver, or any other type of device that can send and receive information. Other non-limiting examples of network interfaces include cellular network interface, wireless network interface, Bluetooth®, 3G and WiFi® radios in mobile computing devices, and USB (Universal Serial Bus), among others. In some embodiments, the computing device 702 uses network interface 713 to wirelessly communicate with an external device, a mobile phone of another, or other networked computing device to receive the social network structure 102 and social network content 104 shown in FIG. 1.

The computing device 702 includes one or more input devices 780. Input devices 780 are configured to receive input from a user through tactile, audio, video, or other sensing feedback. Non-limiting examples of input devices 780 include a presence-sensitive screen, a mouse, a keyboard, a voice responsive system, camera 702, a video recorder 704, a microphone 706, a GPS module 708, or any other type of device for detecting a command from a user or sensing the environment. In some examples, a presence-sensitive screen includes a touch-sensitive screen.

One or more output devices 760 are also included in computing device 702. Output devices 760 are configured to provide output to a user using tactile, audio, and/or video stimuli. Output devices 760 may include a display screen (part of the presence-sensitive screen), a sound card, a video graphics adapter card, or any other type of device for converting a signal into an appropriate form understandable to humans or machines. Additional examples of output device 760 include a speaker, a cathode ray tube (CRT) monitor, a liquid crystal display (LCD), or any other type of device that can generate intelligible output to a user. In some embodiments, a device may act as both an input device and an output device.

The computing device 702 includes one or more power sources 715 to provide power to the computing device 702. Non-limiting examples of power source 715 include single-use power sources, rechargeable power sources, and/or power sources developed from nickel-cadmium, lithium-ion, or other suitable material.

The computing device 702 includes an operating system 718. The operating system 718 is software stored in a memory and executed by a processor. The operating system 718 controls operations of the components of the computing device 702. For example, the operating system 718 facilitates the interaction of communications client 740 with processors 711, memory 712, network interface 713, storage device(s) 714, input device 180, output device 160, and power source 715.

As also illustrated in FIG. 7, the computing device 702 includes communications client 740. Communications client 740 includes communications module 745. Each of communications client 740 and communications module 745 includes program instructions and/or data that are executable by the computing device 702. For example, in one embodiment, communications module 745 includes instructions causing the communications client 740 executing on the computing device 702 to perform one or more of the operations and actions described in the present disclosure. In some embodiments, communications client 740 and/or communications module 745 form a part of operating system 718 executing on the computing device 702.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the disclosure unless otherwise claimed. No language in the specification should be construed as indicating any non-claimed element as essential to the practice of the disclosure.

Variations of the embodiments disclosed herein may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method for predicting virality of a content item, the method comprising:
   receiving a social network structure;
   identifying communities within the social network structure, wherein communities are identified as dense subnetworks in the social network structure, wherein the communities identified as dense subnetworks have a larger proportion of connections between nodes within the community than connections to nodes outside the community;
   receiving social network content that includes one or more content items; and
   identifying one or more content items that are predicted to become viral based on utilization of the content items between different communities in the social network structure.

2. The method according to claim 1, further comprising analyzing the social network content to identify new content items, wherein a content item is a new content item if there are less than a threshold number of instances of the content item in the social network content.

3. The method according to claim 1, wherein the one or more content items comprise one or more of images, videos, webpages, metadata including Twitter hashtags, phrases, sentences, and names of people.

4. The method according to claim 1, wherein identifying one or more content items that are predicted to become viral is based on a number of nodes in the social network structure that have been exposed to the content item within a threshold amount of time.

5. The method according to claim 1, wherein identifying one or more content items that are predicted to become viral is based on a number of nodes in the social network structure that are connected to nodes that have been exposed to the content item within a threshold amount of time.

6. The method according to claim 1, wherein identifying one or more content items that are predicted to become viral is based on a number of nodes in the social network structure that are connected within two degrees of separation to nodes that have been exposed to the content item within a threshold amount of time.

7. The method according to claim 1, wherein identifying one or more content items that are predicted to become viral is based on a maximum distance between any two nodes that have been exposed to the content item within a threshold amount of time.

8. The method according to claim 1, wherein identifying one or more content items that are predicted to become viral is based on a number of distinct communities that have used the content item.

9. A computer-readable storage medium storing instructions that, when executed by a processor, cause a computer system to predict virality of a content item, by performing the steps of:
receiving a social network structure;
identifying communities within the social network structure, wherein communities are identified as dense subnetworks in the social network structure, wherein the communities identified as dense subnetworks have a larger proportion of connections between nodes within the community than connections to nodes outside the community;
receiving social network content that includes one or more content items; and
identifying one or more content items that are predicted to become viral based on utilization of the content items between different communities in the social network structure.

10. The computer-readable storage medium according to claim 9, further comprising analyzing the social network content to identify new content items, wherein a content item is a new content item if there are less than a threshold number of instances of the content item in the social network content.

11. The computer-readable storage medium according to claim 9, wherein the one or more content items comprise one or more of images, videos, webpages, metadata including Twitter hashtags, phrases, sentences, and names of people.

12. The computer-readable storage medium according to claim 9, wherein identifying one or more content items that are predicted to become viral is based on a number of nodes in the social network structure that have been exposed to the content item within a threshold amount of time.

13. The computer-readable storage medium according to claim 9, wherein identifying one or more content items that are predicted to become viral is based on a number of nodes in the social network structure that are connected to nodes that have been exposed to the content item within a threshold amount of time.

14. The computer-readable storage medium according to claim 9, wherein identifying one or more content items that are predicted to become viral is based on a number of nodes in the social network structure that are connected within two degrees of separation to nodes that have been exposed to the content item within a threshold amount of time.

15. The computer-readable storage medium according to claim 9, wherein identifying one or more content items that are predicted to become viral is based on a maximum distance between any two nodes that have been exposed to the content item within a threshold amount of time.

16. The computer-readable storage medium according to claim 9, wherein identifying one or more content items that are predicted to become viral is based on a number of distinct communities that have used the content item.

17. A computing system, comprising:
a processor; and
a memory storing instructions that, when executed by the processor, cause the computing system to:
receive a social network structure;
identify communities within the social network structure, wherein the communities are identified as dense subnetworks in the social network structure, wherein the communities identified as dense subnetworks have a larger proportion of connections between nodes within the community than connections to nodes outside the community;
receive social network content that includes one or more content items; and
identify one or more content items that are predicted to become viral based on utilization of the content items between different communities in the social network structure.

18. The computing system according to claim 17, wherein the social network structure and the social network content are received over a network.

* * * * *